(No Model.)
S. M. FRIEDE.
HARD AND SOFT METAL PIPE COUPLING.
No. 541,736. Patented June 25, 1895.
Fig. I.
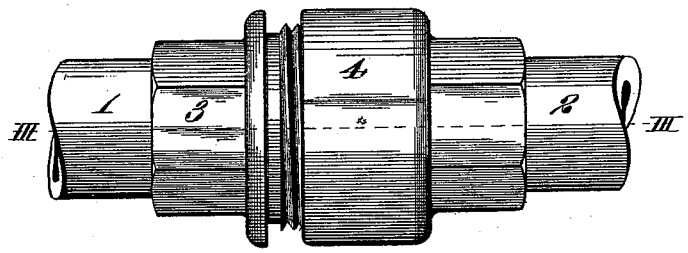
Fig. II.
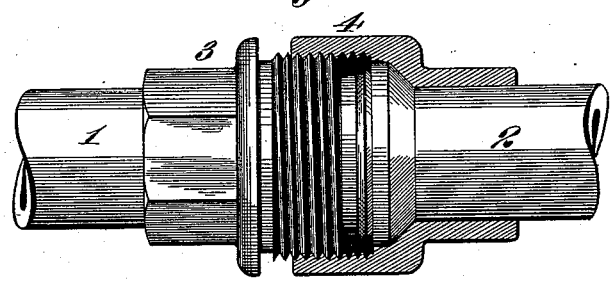
Fig. III.
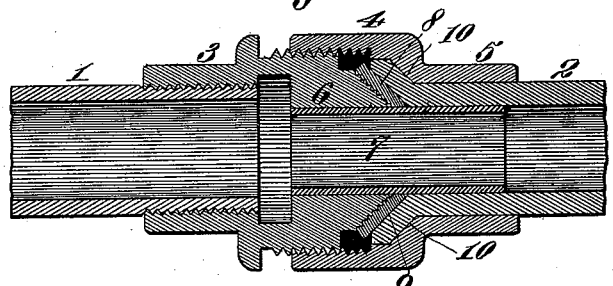
Fig. IV.
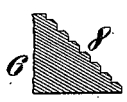
Fig. V.
Attest:
E. S. Knight
H. Finley
Inventor:
Samuel M. Friede,
By Knight Bros
Atty's

UNITED STATES PATENT OFFICE.

SAMUEL M. FRIEDE, OF ST. LOUIS, MISSOURI, ASSIGNOR TO THE STAR COUPLER COMPANY, OF SAME PLACE.

HARD AND SOFT METAL PIPE-COUPLING.

SPECIFICATION forming part of Letters Patent No. 541,736, dated June 25, 1895.

Application filed November 13, 1894. Serial No. 528,697. (No model.)

*To all whom it may concern:*

Be it known that I, SAMUEL M. FRIEDE, of the city of St. Louis, in the State of Missouri, have invented a certain new and useful Improvement in Combination Hard and Soft Metal Pipe-Couplings, of which the following is a full, clear, and exact description, reference being had to the accompanying drawings, forming part of this specification.

My present invention relates to the general class of couplers set forth in my Patent No. 502,665, issued August 1, 1893, and set forth in my applications for patents, Serial No. 522,438, filed September 8, 1894, and Serial No. 522,439, filed September 8, 1894.

My present invention consists in features of novelty hereinafter described and pointed out in the claims.

Figure I is a side elevation illustrative of my invention. Fig. II is a side elevation showing one member of the coupler in section. Fig. III is a longitudinal section taken on line III III, Fig. I. Fig. IV is an enlarged detail view of the serrated or notched cone. Fig. V is an elevation or side view of the coupling sleeve or tube.

Referring to the drawings, 1 represents the end of a hard metal pipe, such as iron, and 2 represents the end of a soft metal pipe, such as lead.

3 represents the male member of the coupler, which is tapped on to the end of the pipe 1, as shown at Fig. III.

4 represents the female member of the coupler, which has a threaded connection with the member 3 and which has a reduced end 5 that receives the end of the pipe 2. The inner end 6 of the member 3 is formed with a socket or opening into which is firmly driven a tube or sleeve 7, about half of the length of the tube being driven into this member of the coupler.

The inner end of the part 6 of the member 3 is formed in the shape of a cone 8, the other face of which is notched or serrated as shown in Figs. III and IV, and against this cone fits a rubber or other washer 9. The end of the pipe 2 is flared, the flaring part fitting between the washer 9 and the inclined shoulder 10 of the member 4 of the coupler, so that when the members are drawn tightly together a perfectly tight joint will be formed.

About one-half of the tube or sleeve 7 enters the pipe 2 when the parts are connected, and this tube or sleeve is of such size as to snugly fit the pipe and thus holds the ends of the pipe in line with the pipe 1 and the members of the coupler as the latter are tightened, so that there is no danger of the pipe 2 being at a slant angle with the pipe 1, when the members of the coupler are screwed together, this angular relation of the parts, when it exists, being objectionable for the reason that a tight straight fit is not made on account of the soft metal of the pipe 2 yielding to the pressure of the coupler, and the pipe not being drawn into line by the coupler with the pipe 1, as it would were it hard metal. By this use of the tube and by forming the serrated cone on the end of the member 3 of the coupler instead of on the tube as in my patent and applications referred to, I am enabled to secure a perfect alignment of the pipes and tighten them together when in this position.

I claim as my invention—

1. In a combined hard and soft metal pipe coupling, the combination of male and female members of the coupler, a tube fitting within the end of the male member of the coupler and adapted to enter the end of the soft metal pipe, and a cone formed on the male member of the coupler, substantially as set forth.

2. In a combined hard and soft metal pipe coupling, the combination of the male and female members, a tube closely fitting within the inner end of the male member and adapted to extend into the end of the soft metal pipe, a serrated cone formed on the inner end of the male member, and a washer located between said cone and the female member of the coupler, substantially as set forth.

3. In a combined hard and soft metal pipe coupling, the combination of the pipe 1, a male member of the coupler tapped on to the pipe 1 and having an inner end 6 formed with a serrated cone 8, a pipe 2 having a flared end 10, a female member 4 having a threaded connection with the member 3, and a washer 9 fitting between said cone and the flared end of the pipe 2, substantially as set forth.

SAMUEL M. FRIEDE.

In presence of—
E. S. KNIGHT,
W. FINLEY.